United States Patent
Ota et al.

(10) Patent No.: US 11,491,559 B2
(45) Date of Patent: Nov. 8, 2022

(54) END MILL

(71) Applicant: KAWASAKI JUKOGYO KABUSHIKI KAISHA, Kobe (JP)

(72) Inventors: Takuya Ota, Kakamigahara (JP); Masayoshi Zaitsu, Kakamigahara (JP); Naohiro Otsuki, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 6 days.

(21) Appl. No.: 17/025,494

(22) Filed: Sep. 18, 2020

(65) Prior Publication Data

US 2021/0078088 A1    Mar. 18, 2021

(30) Foreign Application Priority Data

Sep. 18, 2019   (JP) .............................. JP2019-169166

(51) Int. Cl.
     *B23C 5/10*   (2006.01)

(52) U.S. Cl.
     CPC ........ *B23C 5/10* (2013.01); *B23C 2210/0457* (2013.01); *B23C 2210/088* (2013.01); *B23C 2210/203* (2013.01)

(58) Field of Classification Search
     CPC ........ B23C 2210/04; B23C 2210/0457; B23C 2210/088; B23C 2210/203; B23C 2210/321; B23C 2210/44; B23C 5/10
     See application file for complete search history.

(56) References Cited

U.S. PATENT DOCUMENTS

| | | | | |
|---|---|---|---|---|
| 3,456,316 | A | * | 7/1969 | Dawson .................... B23C 5/10 407/53 |
| 6,991,409 | B2 | | 1/2006 | Noland |
| 7,223,053 | B2 | * | 5/2007 | Flynn ........................ B23C 5/10 407/53 |
| 2015/0209877 | A1 | * | 7/2015 | Hufschmied ............. B23C 5/10 409/131 |
| 2015/0258616 | A1 | * | 9/2015 | Stanbach .................. B23C 5/10 407/54 |
| 2016/0256939 | A1 | * | 9/2016 | Miyamoto ................ B23C 5/10 |
| 2016/0263668 | A1 | * | 9/2016 | Fukata ...................... B23C 5/10 |
| 2017/0216936 | A1 | * | 8/2017 | Dodds ....................... B23C 5/10 |
| 2019/0061021 | A1 | * | 2/2019 | Boulakhov ............... B23C 5/06 |
| 2019/0262913 | A1 | * | 8/2019 | Shpigelman .............. B23C 5/10 |
| 2020/0070258 | A1 | * | 3/2020 | Kress .................... B23C 5/1018 |

FOREIGN PATENT DOCUMENTS

JP          57127608 A  *  8/1982  ............... B23C 5/10

OTHER PUBLICATIONS

Machine Translation of Abstract of JP-57127608-A (Year: 2021).*
Official Human Translation of JP 57-127608 (Year: 2022).*

* cited by examiner

*Primary Examiner* — Nicole N Ramos
(74) *Attorney, Agent, or Firm* — Oliff PLC

(57) ABSTRACT

An end mill includes: a columnar tool body that rotates about a center axis; and outer peripheral cutting edges on an outer peripheral surface of the tool body, the outer peripheral cutting edges including a first outer peripheral cutting edge and a second outer peripheral cutting edge. A relief angle θ of the first outer peripheral cutting edge changes to increase in an axial direction of the tool body from a bottom face that is one end of the tool body. A relief angle θ of the second outer peripheral cutting edge changes to decrease in the axial direction from the bottom face.

6 Claims, 4 Drawing Sheets

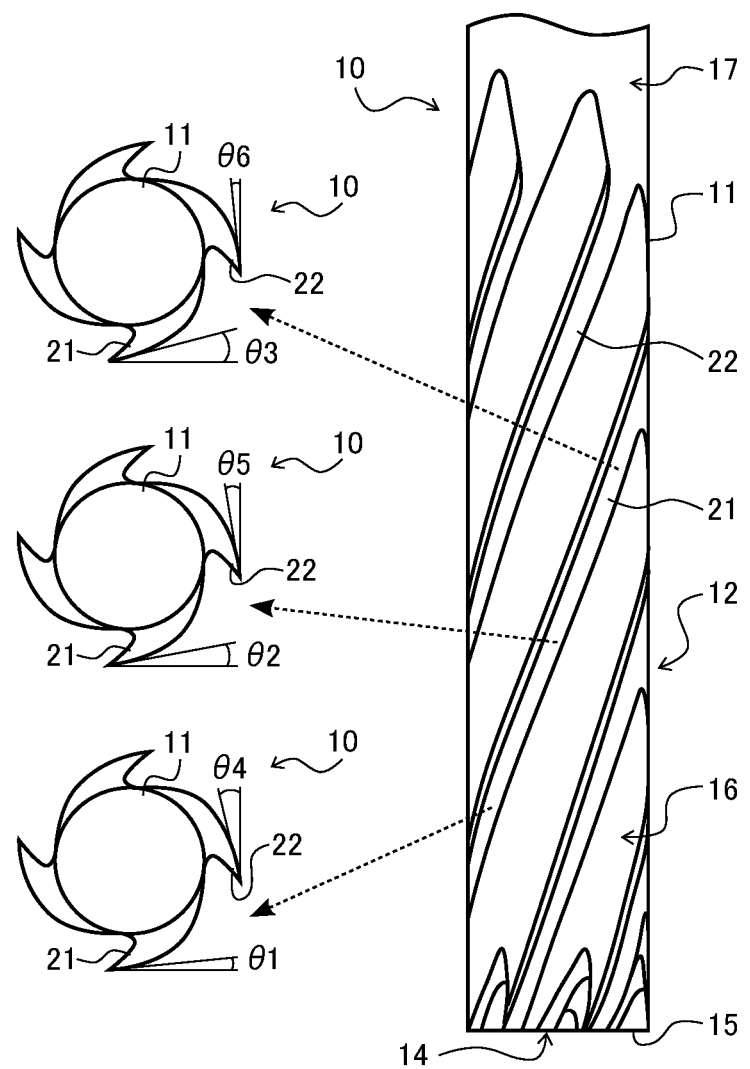

END MILL

CROSS-REFERENCE TO RELATED APPLICATION

This application claims priority to and the benefit of Japanese Patent Application No. 2019-169166, filed on Sep. 18, 2019, the entire disclosure of which is incorporated herein by reference.

BACKGROUND OF THE INVENTION

1. Field of the Invention

The present invention relates to an end mill.

2. Description of the Related Art

An end mill, which is a cutting tool, has end cutting edges and outer peripheral cutting edges. The end cutting edges are provided on the end face (bottom face) of the columnar tool body of the end mill, and the outer peripheral cutting edges are provided on the outer peripheral surface of the tool body. It is known that when such an end mill is used in a cutting process, the end mill vibrates during the cutting, which is called chatter vibrations. The chatter vibrations cause, for example, deterioration in the surface roughness of the machined surface of a workpiece or lowered thickness precision of the workpiece.

As a proposed technique for suppressing the chatter vibrations, for example, the specification of Patent Literature 1 (U.S. Pat. No. 6,991,409) discloses a rotary cutting tool. In Patent Literature 1, the tips of the end cutting edges of the rotary cutting tool are arranged at irregular intervals along the circumference of the end face, and thereby resonant harmonic vibrations, i.e., one type of self-excited chatter vibrations, can be reduced.

SUMMARY

As one example of a method for suppressing the occurrence of resonant harmonic vibrations, it is conceivable to reduce relief angles of the respective outer peripheral cutting edges of the end mill to facilitate contact between the machined surface of the workpiece and relief faces of the respective outer peripheral cutting edges, thereby obtaining a process damping effect owing to the contact by the relief faces.

However, in the case of, for example, machining a thin-wall machining wall or machining the surface of a web, if the relief angles are reduced, the force by which the relief faces of the outer peripheral cutting edges press the machined surface of the workpiece in the thickness direction, i.e., cutting resistance, increases. Consequently, there is a risk that forced chatter vibrations of the standing wall itself may occur, or the standing wall may become curved due to the pressing. This may cause lowered precision or efficiency of the cutting process.

In this respect, Patent Literature 1 describes improving the stability of the cutting process by making the relief angles unequal to each other. However, in the case of the rotary cutting tool of Patent Literature 1, the resonant harmonic vibrations are reduced by making the end cutting edges unequal to each other. Patent Literature 1 discloses nothing about suppressing the chatter vibrations by controlling the relief angles or suppressing the lowering of the precision or efficiency of the cutting process.

The present disclosure has been made in order to solve the above-described problems. An object of the present disclosure is to provide an end mill that is capable of both suppressing the chatter vibrations and suppressing the lowering of the precision or efficiency of a cutting process.

In order to solve the above-described problems, an end mill according to the present disclosure includes: a columnar tool body that rotates about a center axis; and outer peripheral cutting edges provided on an outer peripheral surface of the tool body, the outer peripheral cutting edges including a first outer peripheral cutting edge and a second outer peripheral cutting edge. A relief angle of the first outer peripheral cutting edge changes to increase in an axial direction of the tool body from a bottom face that is one end of the tool body. A relief angle of the second outer peripheral cutting edge changes to decrease in the axial direction from the bottom face.

According to the above configuration, the first outer peripheral cutting edge whose relief angle gradually increases and the second outer peripheral cutting edge whose relief angle gradually decreases are both used as the outer peripheral cutting edges. This makes it possible to suppress excessive increase in cutting resistance that is applied from the end mill to the surface of a workpiece. Consequently, chatter vibrations can be suppressed, and also, lowering of the precision or efficiency of a cutting process can be suppressed.

The present disclosure is able to provide an end mill including outer peripheral cutting edges that make it possible to both suppress the chatter vibrations and suppress the lowering of the precision or efficiency of a cutting process.

BRIEF DESCRIPTION OF THE DRAWINGS

FIG. 2 is a schematic diagram showing a correspondence relationship between outer peripheral cutting edges included in the end mill according to the present disclosure and relief angles of the outer peripheral cutting edges.

DETAILED DESCRIPTION OF THE PREFERRED EMBODIMENTS

Figure 1A:
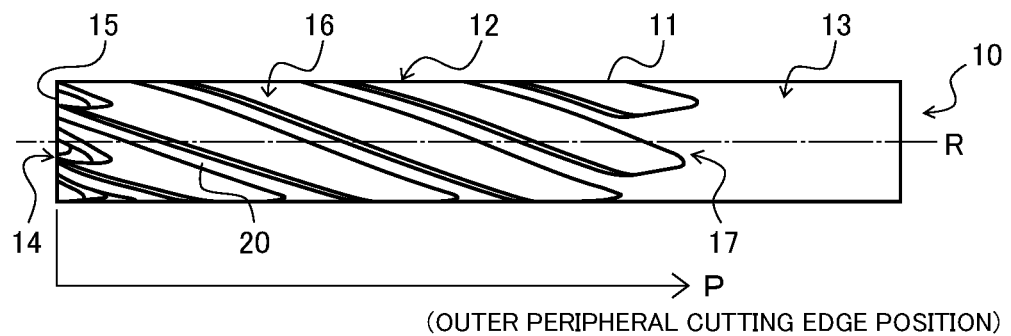
FIG. 1A is a schematic side view showing one example of a schematic configuration of an end mill according to the present disclosure.

Hereinafter, a representative embodiment of the present disclosure is described with reference to the drawings. In the drawings, the same or corresponding elements are denoted by the same reference signs, and repeating the same descriptions is avoided below.

[Fundamental Configuration of an End Mill]

As shown in FIG. 1A, an end mill 10 includes a columnar tool body 11, a cutting part 12, and a shank 13. The cutting part 12 is positioned on the one end face (first end face) side of the tool body 11, and the shank 13 is positioned on the other end face (second end face) side of the tool body 11. For the sake of convenience of the description, the end face of the side on which the cutting part 12 is positioned is referred to as a bottom face 14.

The cutting part 12 is provided with cutting edges. Specifically, the cutting part 12 includes a plurality of end cutting edges 15 provided on the bottom face 14 and a plurality of outer peripheral cutting edges 20 provided on the outer peripheral surface of the cutting part 12. A flute 16 is provided between each pair of adjacent outer peripheral cutting edges 20. The shank 13 corresponds to the "clamping portion" of the end mill 10, and is fixed by a holder or a chuck of a cutting device, such as a machine tool. Accordingly, the end mill 10 rotates about a rotational axis R.

It should be noted that, for the sake of convenience of the description, the bottom face 14 is occasionally referred to as the "tip" of the end mill 10 (or of the tool body 11). Also, the rear end of the cutting part 12 as seen from the tip (the bottom face) 14 (in the example of FIG. 1A, the boundary between the cutting part 12 and the shank 13) is referred to as the "root", which is denoted by a reference sign 17 in the drawing. Further, a position on each outer peripheral cutting edge 20 in the axial direction of the rotational axis R with reference to the tip (the bottom face) 14 is referred to as an "outer peripheral cutting edge position P". For example, the outer peripheral cutting edge position P at the tip (the bottom face) 14 is 0, and the value of the outer peripheral cutting edge position P increases toward the root 17.

Figure 1B:
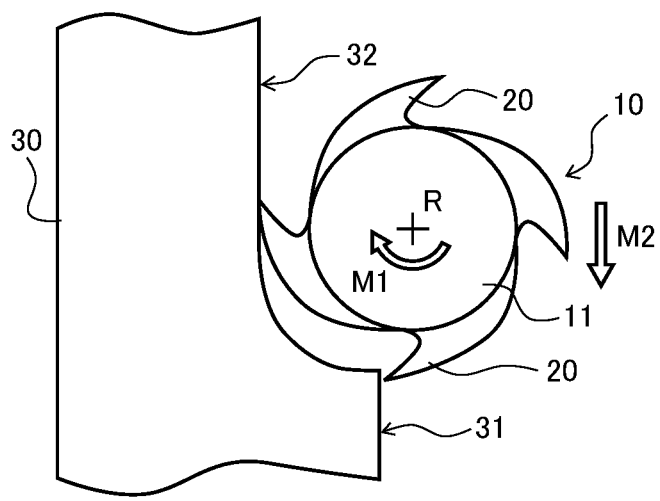
FIG. 1B is a schematic diagram showing a state where the end mill is performing a cutting process on a workpiece.
Figure 1C:
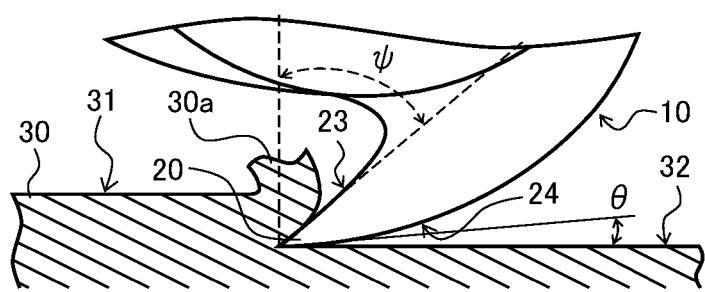
FIG. 1C is a schematic diagram for describing, for example, a relief angle of the end mill.

FIG. 1B is a schematic diagram showing a state where the end mill is performing a cutting process on a workpiece. FIG. 1C shows, in an enlarged manner, a part of the state where the end mill is performing the cutting process. As shown in FIG. 1B, the end mill 10 moves forward in the direction of an arrow M2 while rotating in the direction of an arrow M1 about the rotational axis R. In accordance therewith, a rake face 23 of each outer peripheral cutting edge 20 cuts a work surface 31 of a workpiece 30 as shown in FIG. 1C. As a result, chip 30a is produced by the rake face 23. Consequently, after the cutting, a machined surface 32 is formed on the workpiece 30.

As shown in FIG. 1C, a face positioned on the opposite side of the outer peripheral cutting edge 20 from the rake face 23 is a relief face 24. The angle of the rake face 23 relative to a plane perpendicular to the cutting direction (e.g., the forward movement direction M2 shown in FIG. 1B) is a rake angle ψ indicated by a dashed line in the drawing, and the angle of the relief face 24 relative to the machined surface 32 is a relief angle θ indicated by a solid line in the drawing.

Conventionally, it is known that the rake angle ψ has significant influences on the cutting resistance, discharging of the chip 30a, heat generation during the cutting, the tool life of the end mill 10, etc. Therefore, conventionally, when considering the precision or efficiency of a cutting process, not the relief angle θ but the rake angle ψ has been looked into. On the other hand, in the end mill 10 of the present disclosure, attention is paid to the relief angle θ so as to both suppress the chatter vibrations and suppress lowering of the precision or efficiency of a cutting process. Specifically, the end mill 10 according to the present disclosure is configured such that the relief angle θ of the outer peripheral cutting edge 20 gradually changes from the bottom face 14 in the axial direction of the tool body 11.

[Fundamental Requirements of the Relief Angle]

The right side of FIG. 2 shows the cutting part 12 of the end mill 10, and the left side of FIG. 2 schematically shows partial cross-sectional shapes of the cutting part 12. As shown in FIG. 2, the outer peripheral cutting edges 20 include a first outer peripheral cutting edge 21 and a second outer peripheral cutting edge 22. The relief angle θ of the first outer peripheral cutting edge 21 gradually increases from the bottom face 14 in the axial direction, and the relief angle θ of the second outer peripheral cutting edge 22 gradually decreases from the bottom face 14 in the axial direction.

The relief angle θ of the first outer peripheral cutting edge 21 on the lower part of the end mill 10 is θ1, and the relief angle θ of the first outer peripheral cutting edge 21 on the middle part of the end mill 10 is θ2. The relief angle θ2 is greater than the relief angle θ1. Further, the relief angle θ of the first outer peripheral cutting edge 21 on the upper part of the end mill 10 is θ3. The relief angle θ3 is greater than the relief angle θ2. In this manner, the relief angle θ of the first outer peripheral cutting edge 21 gradually increases from the tip 14 toward the root 17.

On the other hand, the relief angle θ of the second outer peripheral cutting edge 22 on the lower part of the end mill 10 is θ4, and the relief angle θ of the second outer peripheral cutting edge 22 on the middle part of the end mill 10 is θ5. The relief angle θ5 is less than the relief angle θ4. Further, the relief angle θ of the second outer peripheral cutting edge 22 on the upper part of the end mill 10 is θ6. The relief angle θ6 is less than the relief angle θ5. In this manner, the relief angle θ of the second outer peripheral cutting edge 22 gradually decreases from the tip 14 toward the root 17.

As described above, two types of cutting edges, i.e., the first outer peripheral cutting edge 21 whose relief angle θ gradually changes to increase and the second outer peripheral cutting edge 22 whose relief angle θ gradually changes to decrease, are used as the outer peripheral cutting edges 20 of the end mill 10. This makes it possible to suppress excessive increase in the cutting resistance, which is caused by the end mill 10 on the machined surface 32 of the workpiece 30. Consequently, chatter vibrations of the end mill 10 are suppressed, and the relief faces 24 are suppressed from excessively pressing the machined surface 32.

Here, the relief angle θ is merely required to gradually change from the tip 14 toward the root 17 regardless of whether the gradual change in the relief angle θ is a linear change, a non-linear change, or a stepwise change. For example, the relief angle θ may change within the range of 0 to 2° relative to the reference, and the range of change in the relief angle θ may be changed as necessary in accordance with the conditions of the cutting process and other factors.

Figure 3A:
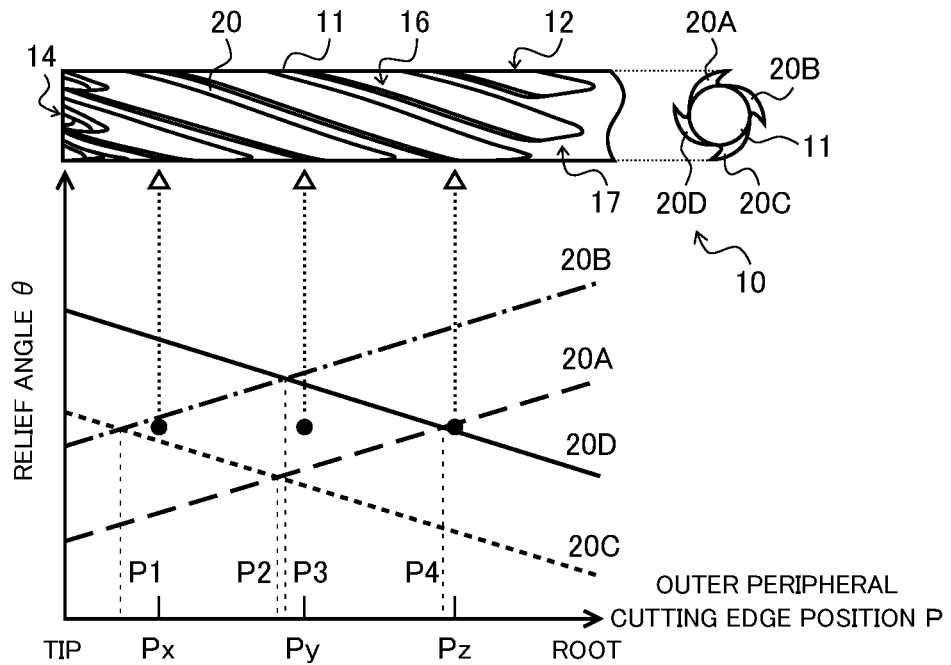
FIG. 3A is a graph showing one example in which the relief angles of the outer peripheral cutting edges included in the end mill according to the present disclosure gradually change from a bottom face toward a root.
Figure 3B:
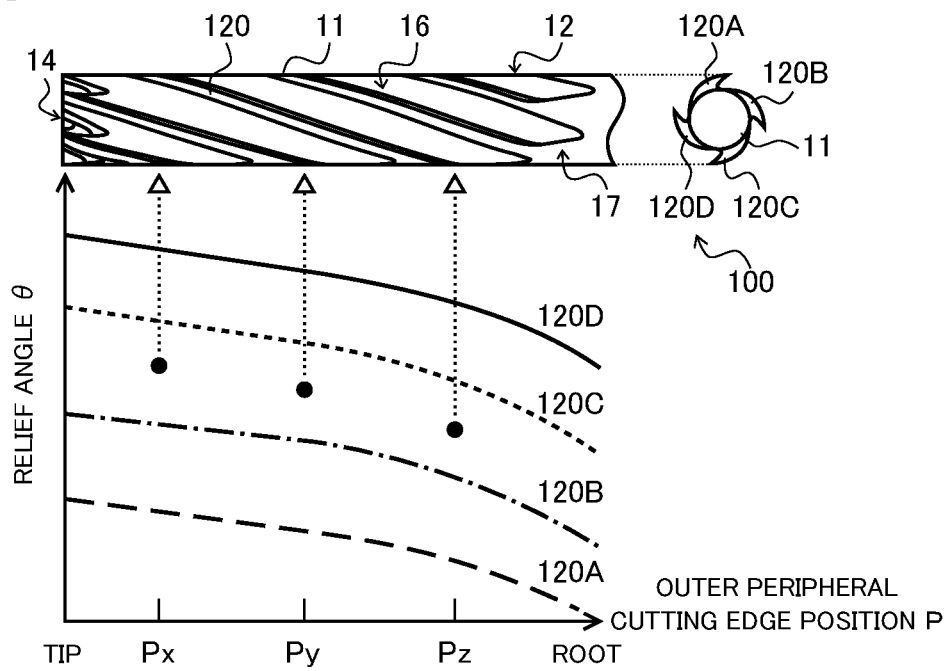
FIG. 3B is a graph showing one example in which the relief angles of the outer peripheral cutting edges included in a conventional end mill gradually change from the bottom face toward the root.

Each of FIGS. 3A and 3B shows relationships each between the outer peripheral cutting edge position P, which is a position on an outer peripheral cutting edge of an end mill in the axial direction, and the relief angle θ of the outer peripheral cutting edge. FIG. 3A shows the end mill 10 of the present disclosure, and FIG. 3B shows a conventional end mill 100. As shown in FIG. 3A, the end mill 10 includes four outer peripheral cutting edges that are an outer peripheral cutting edge 20A, an outer peripheral cutting edge 20B, an outer peripheral cutting edge 20C, and an outer peripheral cutting edge 20D (in the side view of FIG. 3A, only one of the four outer peripheral cutting edges is denoted by a reference sign 20 as a representative example). Here, each of the outer peripheral cutting edge 20A and the outer peripheral cutting edge 20B corresponds to the first outer peripheral cutting edge 21, and each of the outer peripheral cutting edge 20C and the outer peripheral cutting edge 20D corresponds to the second outer peripheral cutting edge 22. In FIG. 3A, a change in the relief angle θ of the outer peripheral cutting edge 20A is indicated by a dashed line; a change in the relief angle θ of the outer peripheral cutting edge 20B is indicated by a one-dot chain line; a change in the relief angle θ of the outer peripheral cutting edge 20C is indicated by a dotted line; and a change in the relief angle θ of the outer peripheral cutting edge 20D is indicated by a solid line.

As shown in FIG. 3A, the relief angle θ of each first outer peripheral cutting edge 21 changes to increase continuously in a linear manner, and, in contrast, the relief angle θ of each second outer peripheral cutting edge 22 changes to decrease continuously in a linear manner. Thus, in this example, the continuous change in the relief angle θ of each first outer peripheral cutting edge 21, which is continuous increase, and the continuous change in the relief angle θ of each second outer peripheral cutting edge 22, which is continuous decrease, are contrary to each other.

The definition of being "contrary to each other" herein includes, for example, a case where the absolute value of the increase rate of the relief angle θ with respect to the outer peripheral cutting edge position P of each first outer peripheral cutting edge 21 substantially coincides with the absolute value of the decrease rate of the relief angle θ with respect to the outer peripheral cutting edge position P of each second outer peripheral cutting edge 22.

To be more specific, the relief angle θ of each of the outer peripheral cutting edge 20A and the outer peripheral cutting edge 20B corresponding to the first outer peripheral cutting edge 21 increases linearly from the tip (the bottom face) 14 to the root 17. In contrast, the relief angle θ of each of the outer peripheral cutting edge 20C and the outer peripheral cutting edge 20D corresponding to the second outer peripheral cutting edge 22 decreases linearly as the outer peripheral cutting edge position P shifts toward the root 17. The absolute value of the slope of the change in the relief angle θ of each of the outer peripheral cutting edge 20A and the outer peripheral cutting edge 20B with respect to the outer peripheral cutting edge position P substantially coincides with the absolute value of the slope of the change in the relief angle θ of each of the outer peripheral cutting edge 20C and the outer peripheral cutting edge 20D with respect to the outer peripheral cutting edge position P.

Also, the definition of being "contrary to each other" herein includes not only the case illustrated in FIG. 3A where the relief angles θ of the first outer peripheral cutting edges 21 and the second outer peripheral cutting edges 22 change in a linear manner, but also a case where the relief angles θ of the first outer peripheral cutting edges 21 and the second outer peripheral cutting edges 22 change constant periodically in a curvilinear manner, such as in a trigonometric functional manner.

Further, being "contrary to each other" herein is not necessarily limited to a case where the absolute value of the slope of the change in the relief angle θ of each first outer peripheral cutting edge 21 coincides with the absolute value of the slope of the change in the relief angle θ of each second outer peripheral cutting edge 22, so long as the relief angle θ of each first outer peripheral cutting edge 21 and the relief angle θ of each second outer peripheral cutting edge 22 change such that a relief angle average value, which will be described below, is constant regardless of the outer peripheral cutting edge position P.

Since the first outer peripheral cutting edges 21 and the second outer peripheral cutting edges 22 thus exist in a mixed manner, excessive increase in the cutting resistance occurring between the machined surface 32 and the relief faces 24 can be suppressed, which consequently makes it possible to effectively suppress the occurrence of forced chatter vibrations between the workpiece 30 and the end mill 10.

Moreover, since the first outer peripheral cutting edges 21 and the second outer peripheral cutting edges 22 exist in a mixed manner, an outer peripheral cutting edge having a small relief angle θ exists regardless of the outer peripheral cutting edge position P or the amount of cutting in the axial direction. Therefore, the process damping effect is not lost, and the occurrence of resonant harmonic vibrations can be suppressed effectively.

Further, as shown in FIG. 3A, the relief angles θ of the respective outer peripheral cutting edges 20A to 20D are all different values from each other except at particular outer peripheral cutting edge positions P. For example, in the case of the first outer peripheral cutting edges 21, the relief angle θ of the outer peripheral cutting edge 20B is greater than that of the outer peripheral cutting edge 20A. The gradual change in the relief angle θ of each of the outer peripheral cutting edge 20A and the outer peripheral cutting edge 20B is linear, and the slope of the increase in the relief angle θ of the outer peripheral cutting edge 20A is the same as the slope of the increase in the relief angle θ of the outer peripheral cutting edge 20B. Therefore, regardless of the outer peripheral cutting edge position P, the relief angle θ of the outer peripheral cutting edge 20A and the relief angle θ of the outer peripheral cutting edge 20B are always different values from each other.

Similarly, in the case of the second outer peripheral cutting edges 22, the relief angle θ of the outer peripheral cutting edge 20D is greater than that of the outer peripheral cutting edge 20C. The gradual change in the relief angle θ of each of the outer peripheral cutting edge 20C and the outer peripheral cutting edge 20D is linear, and the slope of the decrease in the relief angle θ of the outer peripheral cutting edge 20C is the same as the slope of the decrease in the relief angle θ of the outer peripheral cutting edge 20D. Therefore, regardless of the outer peripheral cutting edge position P, the relief angle θ of the outer peripheral cutting edge 20C and the relief angle θ of the outer peripheral cutting edge 20D are always different values from each other.

Further, looking at the outer peripheral cutting edge 20A, which is one of the first outer peripheral cutting edges 21, and the outer peripheral cutting edges 20C and 20D, which are the two second outer peripheral cutting edges 22, the value of the relief angle θ of the outer peripheral cutting edge 20A at the tip 14 is less than the values of the relief angles θ of the respective outer peripheral cutting edges 20C and 20D at the tip 14. Therefore, in the graph, the dashed line indicating the change in the relief angle θ of the outer peripheral cutting edge 20A, and the dotted line indicating the change in the relief angle θ of the outer peripheral cutting edge 20C, cross at an outer peripheral cutting edge position P2. Similarly, in the graph, the dashed line indicating the change in the relief angle θ of the outer peripheral cutting edge 20A, and the solid line indicating the change in the relief angle θ of the outer peripheral cutting edge 20D, cross at an outer peripheral cutting edge position P4.

As described above, the value of the relief angle θ of the outer peripheral cutting edge 20A and the value of the relief angle θ of the outer peripheral cutting edge 20C are the same at the outer peripheral cutting edge position P2, but are different from each other at the other outer peripheral cutting edge positions P. Similarly, the value of the relief angle θ of the outer peripheral cutting edge 20A and the value of the relief angle θ of the outer peripheral cutting edge 20D are the same at the outer peripheral cutting edge position P4, but are different from each other at the other outer peripheral cutting edge positions P. It should be noted that since the relief angle θ of the outer peripheral cutting edge 20D is greater than that of the outer peripheral cutting edge 20C, the outer peripheral cutting edge position P4 is closer to the root 17 than the outer peripheral cutting edge position P2 is (i.e., if it is assumed that the root 17 side is the positive side, P4>P2).

Next, look at the outer peripheral cutting edge 20B, which is one of the first outer peripheral cutting edges 21, and the outer peripheral cutting edges 20C and 20D, which are the two second outer peripheral cutting edges 22. In the graph, the one-dot chain line indicating the change in the relief angle θ of the outer peripheral cutting edge 20B, and the dotted line indicating the change in the relief angle θ of the outer peripheral cutting edge 20C, cross at an outer peripheral cutting edge position P1. Similarly, in the graph, the one-dot chain line indicating the change in the relief angle θ of the outer peripheral cutting edge 20B, and the solid line indicating the change in the relief angle θ of the outer peripheral cutting edge 20D, cross at an outer peripheral cutting edge position P3.

As described above, the value of the relief angle θ of the outer peripheral cutting edge 20B and the value of the relief angle θ of the outer peripheral cutting edge 20C are the same at the outer peripheral cutting edge position P1, but are different from each other at the other outer peripheral cutting edge positions P. Similarly, the value of the relief angle θ of the outer peripheral cutting edge 20B and the value of the relief angle θ of the outer peripheral cutting edge 20D are the same at the outer peripheral cutting edge position P3, but are different from each other at the other outer peripheral cutting edge positions P. It should be noted that since the relief angle θ of the outer peripheral cutting edge 20B is greater than that of the outer peripheral cutting edge 20A, the outer peripheral cutting edge position P2 is closer to the root 17 than the outer peripheral cutting edge position P1 is (i.e., if it is assumed that the root 17 side is the positive side, P2>P1). Among the outer peripheral cutting edge positions P1 to P4, the outer peripheral cutting edge position P1 is the closest position to the tip (the bottom face) 14, and the outer peripheral cutting edge positions P2 to P4 are sequentially arranged toward the root 17 in this order (i.e., if it is assumed that the root 17 side is the positive side, P1<P2<P3<P4).

As described above, the values of the relief angles θ of the plurality of respective outer peripheral cutting edges 20 can be made different from each other at an arbitrary outer peripheral cutting edge position P. This makes it possible to more effectively suppress excessive increase in the cutting resistance occurring between the relief faces 24 and the machined surface 32 regardless of the cutting amount in the axial direction.

The value of the relief angle θ of at least one first outer peripheral cutting edge 21 and the value of the relief angle θ of at least one second outer peripheral cutting edge 22 are the same at a particular outer peripheral cutting edge position P. Accordingly, regardless of the outer peripheral cutting edge position P, the sum of the values of the relief angles θ of the first and second outer peripheral cutting edges 21 and 22 falls within a predetermined range. For this reason, variation in the relief angle θ of each of the outer peripheral cutting edges 20 can be kept within a suitable range. Therefore, regardless of the outer peripheral cutting edge position P or the cutting amount in the axial direction, excessive increase in the cutting resistance occurring between the relief faces 24 and the machined surface 32 can be suppressed more effectively.

Here, the sum of the values of the relief angles θ of the first and second outer peripheral cutting edges 21 and 22 (i.e., the sum of the relief angles θ) at an arbitrary outer peripheral cutting edge position P may be divided by the total number of first and second outer peripheral cutting edges 21 and 22, and thereby the aforementioned "relief angle average value" can be calculated. The black circle symbols in FIG. 3A indicate relief angle average values at arbitrary outer peripheral cutting edge positions Px, Py, and Pz, and these relief angle average values are the same. Since the relief angle average value is thus made constant regardless of the outer peripheral cutting edge position P, excessive increase in the cutting resistance occurring between the relief faces 24 and the machined surface 32 can be suppressed more effectively regardless of the cutting amount in the axial direction.

[Relief Angle of a Conventional End Mill]

For the sake of comparison to the end mill 10 of the present disclosure, the relief angles of the outer peripheral cutting edges of the conventional end mill 100 are described. Similar to the end mill 10 of the present disclosure, the conventional end mill 100 includes four outer peripheral cutting edges 120A to 120D. In the graph shown in FIG. 3B, a change in the relief angle θ of the outer peripheral cutting edge 120A is indicated by a dashed line; a change in the relief angle θ of the outer peripheral cutting edge 120B is indicated by a one-dot chain line; a change in the relief angle θ of the outer peripheral cutting edge 120C is indicated by a dotted line; and a change in the relief angle θ of the outer peripheral cutting edge 120D is indicted by a solid line.

As shown in FIG. 3B, the relief angle θ of each of the outer peripheral cutting edges 120A to 120D gradually decreases as the outer peripheral cutting edge position P shifts toward the root 17. The outer peripheral cutting edge 120A has the smallest value of the relief angle θ. Then, the outer peripheral cutting edge 120B, the outer peripheral cutting edge 120C, and the outer peripheral cutting edge 120D have greater values of the relief angle θ, increasing in this order. As the outer peripheral cutting edge position P shifts toward the root 17, the relief angles θ of the respective outer peripheral cutting edges 120A to 120D gradually decrease with the same trend. In particular, the relief angles θ of the respective outer peripheral cutting edges 120A to 120D change in a non-linear manner when the outer peripheral cutting edge position P gets closer to the root 17, and none of the relief angles θ of the outer peripheral cutting edges 120A to 120D show a linear gradual change.

In the case of the conventional end mill 100 thus configured, each of the outer peripheral cutting edges 120A to 120D corresponds to the second outer peripheral cutting edge 22, and the conventional end mill 100 includes no first outer peripheral cutting edge 21. Therefore, there is a risk that the cutting resistance occurring between the machined surface 32 and the relief faces 24 of the outer peripheral cutting edges 120A to 120D may become excessively great at a specific outer peripheral cutting edge position P or at a specific cutting amount in the axial direction, or there is a risk that the process damping effect may be almost lost.

Therefore, in the case of the conventional end mill 100, chatter vibrations tend to occur.

Further, black circle symbols in FIG. 3B that represent the relief angle average values at arbitrary outer peripheral cutting edge positions Px, Py, and Pz on the end mill 100 indicate that the relief angle average value decreases as the outer peripheral cutting edge position P shifts toward the root 17. In this case, the relief angle average value varies greatly over the entire cutting part 12, and the deviation from a suitable relief angle average value increases in accordance with increase in the cutting amount in the axial direction. Accordingly, chatter vibrations tend to be great.

In FIG. 3B, it appears that, at the tip 14 side of the end mill 100, each of the relief angles $\theta$ partly shows a gradual change at a uniform rate. However, the change rates of the relief angles $\theta$ are clearly different in the vicinity of the root 17. Accordingly, although chatter vibrations may not occur when cutting is performed with the tip 14 side of the cutting part, it is possible that chatter vibrations occur when cutting is performed with the root 17 side of the cutting part 12.

[Comparison of the End Mill of the Present Disclosure with Conventional End Mills in Terms of the Precision or Efficiency of a Cutting Process]

Figure 4A:
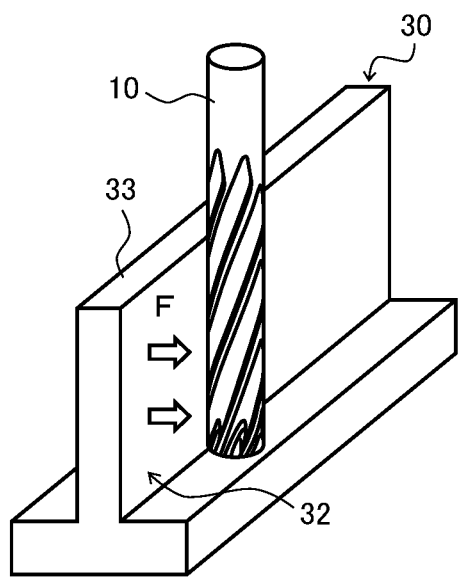
FIG. 4A is a schematic perspective view showing one example in which the end mill according to the present disclosure performs a cutting process on a workpiece.
Figure 4B:
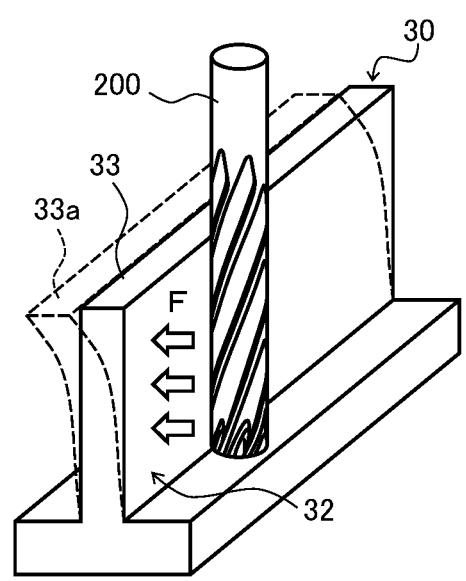
FIG. 4B is a schematic perspective view showing one example in which a conventional end mill performs a cutting process on a workpiece.
Figure 4C:
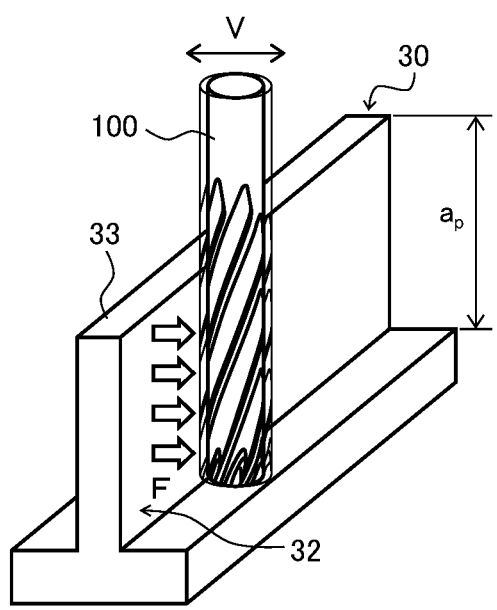
FIG. 4C is a schematic perspective view showing one example of chatter vibrations occurring during a cutting process performed by a conventional end mill.
Figure 4D:
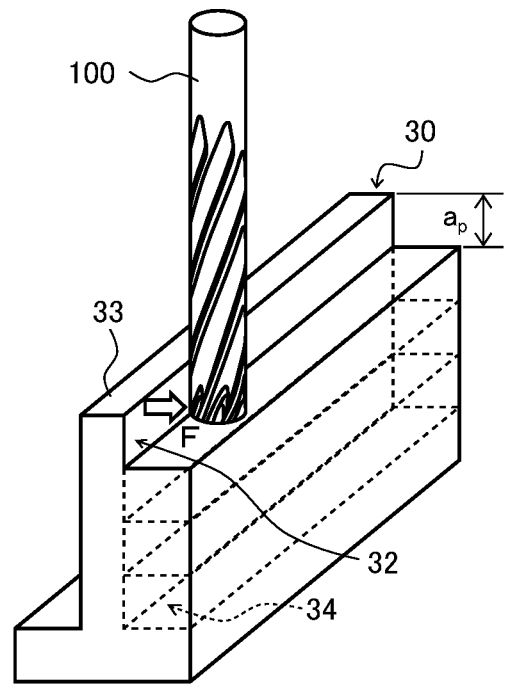
FIG. 4D is a schematic perspective view showing one example of a cutting process for avoiding the occurrence of chatter vibrations caused by the conventional end mill.

FIGS. 4A to 4D are schematic diagrams each showing a cutting process performed on a workpiece 30 to form a thin standing wall 33. FIG. 4A is a schematic diagram showing a case where the end mill 10 of the present disclosure is used. Each of FIGS. 4B to 4D is a schematic diagram showing a case where the conventional end mill 100 or 200 is used.

As shown in FIG. 4C, when the conventional end mill 100 is used to perform a cutting process on the workpiece 30 with a great cutting depth $a_p$ to form the standing wall 33, force is applied in the direction of arrows F due to the cutting resistance occurring between the machined surface 32 of the standing wall 33 and the end mill 100. Therefore, chatter vibrations tend to occur as indicated by an arrow V. At the time, depending on the stiffness of each of the standing wall 33 and the end mill 100, chatter vibrations of the standing wall 33 also occur.

On the other hand, FIG. 4D shows a case where the conventional end mill 100 is used to perform a cutting process on the workpiece 30 with a small cutting depth $a_p$ in the axial direction. In this case, although the chatter vibrations are suppressed, the amount of cutting performable in a single machining path is reduced, which causes lowered machining efficiency. Specifically, the cutting depth shown in FIG. 4D is ¼ of the cutting depth shown in FIG. 4C. Accordingly, the number of machining process steps that need to be performed in the case of adopting the cutting depth of FIG. 4D is four times the number of machining process steps that need to be performed in the case of adopting the cutting depth of FIG. 4C. Thus, in the case of FIG. 4D, machining efficiency is lowered significantly.

In this respect, it is conceivable to reduce the relief angles $\theta$ of the end mill to facilitate the contact between the machined surface 32 and the relief faces 24, thereby suppressing the occurrence of chatter vibrations. FIG. 4B is a schematic diagram showing a case where the end mill 200, whose relief angles $\theta$ are reduced compared to the relief angles $\theta$ of the conventional end mill 100 is used to perform a cutting process. As shown in FIG. 4B, when the end mill 200 is used to perform a cutting process on the workpiece 30 to form the standing wall 33, the cutting resistance caused by the outer peripheral surface of the end mill 200 is great, and the end mill 200 presses the machined surface 32. As a result, the standing wall 33 is strongly pressed in the thickness direction. Consequently, the standing wall 33 becomes curved as indicated by a reference sign 33*a*. If the standing wall 33 in the curved state is further subjected to the cutting process, the precision of the machined surface 32 is lowered. At the time, depending on the stiffness of each of the standing wall 33 and the end mill 200, the end mill 200 becomes curved, which consequently causes lowered precision.

On the other hand, the end mill 10 according to the present disclosure includes: the first outer peripheral cutting edges 21 whose relief angles $\theta$ increase from the tip of the end mill 10 toward the root thereof; and the second outer peripheral cutting edges 22 whose relief angles decrease from the tip of the end mill 10 toward the root thereof. Therefore, even in a case where the cutting depth is great, the cutting process can be performed stably with high precision. Specifically, as shown in FIG. 4A, even if the cutting depth is made great, excessively great cutting resistance will not be applied from the machined surface 32 of the standing wall 33 to the end mill 10. This makes it possible to effectively suppress chatter vibrations and set each machining path long, and thereby lowering of the efficiency of the cutting process can be suppressed.

In particular, compared to the end mill 200 whose relief angles $\theta$ are simply reduced, the end mill 10 of the present disclosure can suppress excessive increase in the cutting resistance caused by the outer peripheral surface, and even when the thin standing wall 33 is subjected to the cutting process with the end mill 10, the thin standing wall 33 will not be curved. Consequently, the workpiece 30 will not be displaced during the cutting process, and this makes it possible to suppress lowering of the precision of the cutting process.

Although a method adopted for evaluating the precision of the machined surface 32 is not particularly limited herein, for example, the precision of the machined surface 32 may be evaluated by using the surface roughness Ra of the machined surface 32 after undergoing the machining with the end mill 10 (i.e., by using machining surface roughness). The reason for this is that the machining surface roughness of the machined surface 32 becomes relatively high if chatter vibrations occur during the cutting process. Therefore, if the machining surface roughness is relatively low, it means that the cutting process has been performed with high precision.

A method adopted for evaluating the suppression of chatter vibrations is not limited to one using the machining surface roughness. The suppression of chatter vibrations may be evaluated by using the cutting resistance during the cutting process. If the cutting resistance is relatively low, it means that the occurrence of chatter vibrations is suppressed favorably. Further, if the occurrence of chatter vibrations is suppressed successfully, it is not necessary to repeat the machining along the same machining path many times, which makes it possible to suppress lowering of the efficiency of the cutting process.

[Variations]

The fundamental configuration of the end mill 10 is not limited to the one shown in FIG. 1A. For example, although the cutting part 12 and the shank 13 are positioned continuously in the configuration shown in FIG. 1A, a neck part having a smaller external diameter may be provided between the cutting part 12 and the shank 13. Although the external diameter of the cutting part 12 is constant in the longitudinal direction, a tapered portion may be formed on the cutting part 12. Alternatively, the shank 13 is not limited to a straight shank whose diameter is constant in the longitudinal direction, but may be a tapered shank including a tapered portion.

In FIG. 1A, the cutting part 12 and the shank 13 are integrated together, i.e., a solid type end mill. Alternatively, the end mill 10 may be a different type of end mill. For example, the cutting part 12 may be brazed to the tool body 11, i.e., a brazed type end mill, or the cutting edges may be made replaceable, i.e., a throw-away type end mill. Further, the number of cutting edges of the end mill 10 is not particularly limited, so long as the number of cutting edges of the end mill 10 is two or more. Generally speaking, the number of cutting edges of the end mill 10 is preferably within the range of two to nine.

The configuration of the end cutting edges 15 is not particularly limited. For example, known configurations such as square end, ball end, radius end, corner chamfer, corner rounding, and drill nose are adoptable. Also, the configuration of the outer peripheral cutting edges 20 is not particularly limited. Known configurations such as parallel cutting edges, roughing cutting edges, nicked cutting edges, tapered cutting edges, and tapered roughing cutting edges are adoptable.

The materials of the end mill 10 are not particularly limited. Examples of the material of the cutting part 12 include known materials such as high speed tool steel (HSS), cemented carbide, cermet, ceramics, diamond, and cubic boron nitrate (cBN). The end mill 10 may be surface treated by a known surface treatment technique.

A cutting method adopted by the end mill 10 is also not particularly limited. For example, the machining path (tool path) of the end mill 10 may be a straight path, a curved path, or a combination of these. The cutting speed, feeding speed, cutting depth, cutting direction, and the like of the end mill 10 are also not particularly limited. The feeding direction, feeding amount, and the like of the end mill 10 are also not particularly limited. In FIG. 1B, the forward movement direction M2 is the only feeding direction of the end mill 10. Alternatively, the feeding direction of the end mill 10 may be a direction orthogonal to the forward movement direction M2. Further alternatively, the end mill 10 may be configured to be able to move forward and backward in the axial direction (longitudinal direction).

The end mill 10 may include other outer peripheral cutting edges that are configured differently from the first and second outer peripheral cutting edges. Further, in the present embodiment, the number of outer peripheral cutting edges is four, which is an even number. The four outer peripheral cutting edges are constituted by two first outer peripheral cutting edges and two second outer peripheral cutting edges. However, these numbers are not thus limited. For example, the number of first outer peripheral cutting edges may be greater than the number of second outer peripheral cutting edges, or the number of second outer peripheral cutting edges may be greater than the number of first outer peripheral cutting edges. The number of outer peripheral cutting edges may be an odd number.

What is claimed is:

1. An end mill comprising:
a columnar tool body that rotates about a center axis, the tool body having a diameter that is constant in an axial direction of the tool body from a shank end to a machining end of the tool body; and
a plurality of outer peripheral cutting edges on an outer peripheral surface of the tool body;
the plurality of outer peripheral cutting edges comprising at least two first outer peripheral cutting edges and at least two second outer peripheral cutting edges, each of the at least two first outer peripheral cutting edges having a relief angle and each of the at least two second outer peripheral cutting edges having a relief angle;
wherein the relief angle of each of the at least two first outer peripheral cutting edges increases continuously in the axial direction of the tool body from the shank end to the machining end, while the relief angle of each of the at least two second outer peripheral cutting edges decreases continuously in the axial direction of the tool body from the shank end to the machining end; and
at an arbitrary position in the axial direction each of the relief angles of each of the at least two first outer peripheral cutting edges is different from each other, and
at an arbitrary position in the axial direction each of the relief angles of each of the at least two second outer peripheral cutting edges is different from each other.

2. The end mill according to claim 1, wherein a manner in which the relief angle of the at least two first outer peripheral cutting edges changes in the axial direction of the tool body from the shank end to the machining end, and a manner in which the relief angle of the at least two second outer peripheral cutting edges changes in the axial direction of the tool body from the shank end to the machining end, are contrary to each other.

3. The end mill according to claim 1, wherein the relief angle of one of the at least two first outer peripheral cutting edges and the relief angle of one of the at least two second outer peripheral cutting edges is the same at a particular position in the axial direction, and the relief angle of one of the at least two first outer peripheral cutting edges and the relief angle of one of the at least two second outer peripheral cutting edges are different from each other at an arbitrary position different from the particular position.

4. The end mill according to claim 1, wherein a value obtained by dividing: 1) a sum of the relief angles of one the at least two first outer peripheral cutting edges and one of the at least two second outer peripheral cutting edges at an arbitrary outer peripheral cutting edge position by 2) a number of the at least two first outer peripheral cutting edges and the at least two second outer peripheral cutting edges, is a relief angle average value, and the relief angle average value is constant at an arbitrary position in the axial direction.

5. The end mill according to claim 1, wherein each of the relief angles of one of the at least two first outer peripheral cutting edges and each the relief angles of one of the at least two second outer peripheral cutting edges changes within a range of 2° or less.

6. An end mill comprising:
a columnar tool body having a diameter, a shank end and a machining end; the tool body having a constant diameter extending in an axial direction along a center rotation axis between the shank end and the machining end;
the end mill, on an outer peripheral surface, comprises a plurality of outer peripheral cutting edges extending between the machining end and shank end;
wherein the plurality of outer peripheral cutting edges comprises in order along a circumferential rotation direction:
at least a first outer peripheral cutting edge having a first relief angle,
at least a second outer peripheral cutting edge having a second relief angle,
at least a third outer peripheral cutting edge having a third relief angle, and at least a fourth outer peripheral cutting edge having a fourth relief angle;

wherein the each of the first relief angle and third relief angle increases continuously in the axial direction from the shank end to the machining end while each of the second relief angle and the fourth relief angle decreases continuously in the axial direction from the shank end to the machining end;

wherein the first relief angle is different from the third relief angle at an arbitrary position in the axial direction, and the second relief angle is different from the fourth relief angle at an arbitrary position in the axial direction.

\* \* \* \* \*